US010781374B2

(12) United States Patent
Streich

(10) Patent No.: US 10,781,374 B2
(45) Date of Patent: Sep. 22, 2020

(54) ARRANGEMENT OF A COKE DRUM AND OF A COKE CRUSHING UNIT, FOR USE IN A CLOSED, GAS-TIGHT SYSTEM FOR GAINING SELLABLE PETROLEUM COKE PIECES OUT OF SOLIDIFIED PETROLEUM COKE IN A COKE DRUM UNIT AND A CLOSED, GAS-TIGHT SYSTEM COMPRISING SUCH ARRANGEMENT

(71) Applicant: TRIPLAN AG, Bad Soden (DE)

(72) Inventor: Zheng-Zhu Streich, Alzenau (DE)

(73) Assignee: TRIPLAN AG, Bad Soden (DE)

( * ) Notice: Subject to any disclaimer, the term of this patent is extended or adjusted under 35 U.S.C. 154(b) by 0 days.

(21) Appl. No.: 16/313,959

(22) PCT Filed: Jun. 28, 2016

(86) PCT No.: PCT/EP2016/065004
§ 371 (c)(1),
(2) Date: Dec. 28, 2018

(87) PCT Pub. No.: WO2018/001462
PCT Pub. Date: Jan. 4, 2018

(65) Prior Publication Data
US 2019/0322941 A1  Oct. 24, 2019

(51) Int. Cl.
C10B 33/14 (2006.01)
C10B 25/10 (2006.01)
(Continued)

(52) U.S. Cl.
CPC .............. C10B 33/14 (2013.01); B01J 3/002 (2013.01); C10B 1/04 (2013.01); C10B 25/10 (2013.01); C10B 33/003 (2013.01); B01J 3/02 (2013.01)

(58) Field of Classification Search
CPC ......... C10B 55/00; C10B 55/02; C10B 55/04; C10B 55/06; C10B 55/08; C10B 55/10;
(Continued)

(56) References Cited

U.S. PATENT DOCUMENTS 3,857,758 A * 12/1974 Mole ....................... C10B 27/04
201/40
4,960,358 A * 10/1990 DiGiacomo ............ C10B 25/10
202/241
(Continued)

FOREIGN PATENT DOCUMENTS

RU      2206594 C1    6/2003
WO    2009033600 A1   3/2009
(Continued)

OTHER PUBLICATIONS

International Search Report for PCT/EP2016/065004 dated Feb. 20, 2017.
(Continued)

Primary Examiner — Jonathan Luke Pilcher
(74) Attorney, Agent, or Firm — Bachman & LaPointe, P.C.

(57) ABSTRACT

An arrangement of a coke drum unit and of a coke crushing unit for use in a closed, gastight system for gaining sellable petroleum coke pieces out of solidified petroleum coke in a coke drum unit. It comprises a coke drum unit containing solidified petroleum coke; a coke crushing unit for crushing the petroleum coke into sellable petroleum coke pieces arranged below the coke drum unit; a lower funnel connected to the coke crushing unit and having an upper end portion; an upper funnel connected to the lower end of the coke drum unit and having a lower end portion with a smaller diameter than the upper end portion of the lower funnel; the lower end portion of the upper funnel extending into the upper end portion of the lower funnel; and at least
(Continued)

one circumferential sealing element providing a gastight sealing between the upper funnel and the lower funnel and allowing for an axial and radial movement of the upper funnel with respect to the lower funnel.

13 Claims, 4 Drawing Sheets

(51) Int. Cl.
*B01J 3/00* (2006.01)
*C10B 1/04* (2006.01)
*C10B 33/00* (2006.01)
*B01J 3/02* (2006.01)

(58) Field of Classification Search
CPC ....... C10B 33/003; C10B 33/12; C10B 33/14; C10B 31/02; C10B 25/10; B01J 3/02; B01J 3/002
USPC .......................................................... 141/346
See application file for complete search history.

(56) References Cited

U.S. PATENT DOCUMENTS

| | | | | |
|---|---|---|---|---|
| 5,628,603 | A | * | 5/1997 | Antalffy .................. C10B 33/14 193/30 |
| 6,206,059 | B1 | | 3/2001 | Maakad et al. |
| 9,546,322 | B2 | | 1/2017 | Gast |
| 2014/0076707 | A1 | * | 3/2014 | Gast ........................ C10B 39/06 201/3 |

FOREIGN PATENT DOCUMENTS

| WO | 2012152340 A1 | 11/2012 |
|---|---|---|
| WO | 2013159826 A1 | 10/2013 |

OTHER PUBLICATIONS

Russian Office Action dated Jun. 3, 2019 issued for corresponding Russian Patent Application No. 2019102024/20.
Russian Search Report dated May 31, 2019 issued for corresponding Russian Patent Application No. 2019102024/20.

* cited by examiner

ARRANGEMENT OF A COKE DRUM AND OF A COKE CRUSHING UNIT, FOR USE IN A CLOSED, GAS-TIGHT SYSTEM FOR GAINING SELLABLE PETROLEUM COKE PIECES OUT OF SOLIDIFIED PETROLEUM COKE IN A COKE DRUM UNIT AND A CLOSED, GAS-TIGHT SYSTEM COMPRISING SUCH ARRANGEMENT

BACKGROUND OF THE INVENTION

The present invention relates to an arrangement of a coke drum and of a coke crushing unit, for use in a closed, gas-tight system for gaining sellable petroleum coke pieces out of solidified petroleum coke in a coke drum unit and to a closed, gas-tight system comprising such arrangement.

From the WO 2012/152340 A1 a closed coke slurry system and method for gaining sellable petroleum coke pieces out of solidified petroleum coke in a coke drum unit is known. However, at the side of the coke drum unit and the coke crushing unit problems during the operation have occurred. In the worst case such problems may lead to damage in the piping and in the coke crushing unit and may lead to leaks in the system which has to be avoided.

SUMMARY OF THE INVENTION

Accordingly, it is an object of the present application to enable a stable, safe and damage-free operation of the system for gaining sellable petroleum coke pieces out of solidified petroleum coke in a coke drum unit, particularly at the side of a coke drum and the coke crushing unit.

This object is solved by the subject matter of the independent claims. Advantageous embodiments are defined in the subclaims.

According to the present invention, an arrangement of a coke drum unit and of a coke crushing unit, for use in a closed, gastight system for gaining sellable petroleum coke pieces out of solidified petroleum coke in a coke drum unit, comprises a coke drum unit containing solidified petroleum coke; a coke crushing unit for crushing the petroleum coke into sellable petroleum coke pieces arranged below the coke drum unit; a lower funnel connected to the coke crushing unit and having an upper end portion; a upper funnel connected to the lower end of the coke drum unit and having a lower end portion with a smaller diameter than the upper end portion of the lower funnel; the lower end portion of the upper funnel extending into the upper end portion of the lower funnel; and at least one circumferential sealing element providing a gastight sealing between the upper funnel and the lower funnel and allowing for an axial and radial movement of the upper funnel with respect to the lower funnel.

The inventors of the present invention have found out that most problems occurring at the side of the coke drum unit and the coke crushing unit that lead to an unstable operation or in the worst case to damages or leaks in the system are caused by the huge temperature differences occurring within the coke drum unit, particularly within the lower cone thereof.

During the decoking cycle when the solidified petroleum is cut out of the coke drum unit by means of a coke cutting unit, temperatures of around 700° C. occur at the coke drum unit. During the quenching cycle when the coke drum unit is flooded with cold water through a cold quench water line leading from the clean water tank to the coke drum unit and such the quench water heats against the solidified coke which is cooled down and hardens, the temperature at the coke drum unit sinks is about 100° C.

The inventors of the present invention have also found out that the metal transition pieces that were used to connect the coke drum unit with the coke crushing unit are also subjected to such extreme ranges of temperatures occurring during the different thermal cycles, namely during the quenching, decoking and dewatering cycles.

Furthermore, the petroleum coke chunks that are cut out from the coke drum unit and that get from the coke drum unit to the coke crushing unit are of considerable size and weight, and therefore such metal transition pieces and the coke crushing unit are also subjected to mechanical shocks.

Coke drums can have a height of 40 to 50 m. Therefore, axial and radial deformations of the lower cone of the coke drum unit and the transition piece to the coke crushing unit have been observed, which phenomenon has been called banana effect.

In order to prevent an expanding and shrinking movement of the lower cone of the coke drum unit in axial direction and also to prevent radial movement of the lower cone of the coke drum unit from compromising the efficiency of the system or in the worst case even from damaging the system the inventors have developed the arrangement of a coke drum unit and of a coke crushing unit according to the embodiments of the present invention.

In such arrangement, a lower funnel is connected to the coke crushing unit and an upper funnel is connected to the lower end of the coke drum unit, the upper funnel having a lower end portion with the smaller diameter than the upper end portion of the lower funnel, wherein the lower end portion of the upper funnel extends into the upper end portion of the lower funnel and wherein at least one circumferential sealing providing a gas-tight sealing between the upper funnel and the lower funnel, and allowing for an axial and radial movement of the upper funnel with respect to the lower funnel have been developed.

In such arrangement, the lower and upper funnels are not firmly connected to each other but rather connected to each other in a sealing fashion allowing for movement of the upper funnel versus the lower funnel both in the axial and in the radial direction. By such arrangement, the coke drum unit, particularly its lower cone and the upper funnel connected thereto are mechanically decoupled from the lower funnel and the coke crushing unit, to which the lower funnel is connected.

On the other hand, the system for gaining sellable petroleum coke pieces out of solidified petroleum coke still remains close and gas-tight with no steams that might contain hydrocarbons, coke dust and aerosols discharging from the system into the atmosphere.

Damages of the system, for example cracks or leaks in the funnels connecting the coke drum unit to the coke crushing unit, in the lower cone of the coke drum unit or in the coke crushing unit, can reliably be avoided.

By an arrangement of a coke drum and of a coke crushing unit according to the present invention, the coke drum unit can be emptied safely, and the solidified coke from the coke drum can be cut out and safely guided to the subsequent units coke crushing unit, closed slurry pipe, closed slurry pit, dewatering bin unit, closed drain water pit, water settling tank, clean water tank and removal unit.

The coke crushing unit is for grinding the coke chunks, cut from the solidified petroleum coke by the coke cutting unit, to sellable petroleum coke pieces of a size enabling pumping of the petroleum coke slurry. The coke crushing unit is formed as a coke crusher mounted under the associated coke drum unit. The coke chunks falling out of the coke drum automatically get, through the upper and lower funnels, as described herein, to the coke crushing unit, where they are ground. The coke crushing unit can comprise crush rolls with teeth patterns, in order to grind the coke chunks falling out of the coke drum unit to coke pieces of a predetermined maximum size that fits to the commercial demand. No further size reduction is needed. The coke crushing unit can comprise two crusher rolls, being driven separately, and reversible drives. The coke crushing unit has a designed capacity suitable to handle instantly 200% of peak cutting load and has a roll diameter and teeth pattern which pull in feature for crushing maximum lump size.

Petroleum coke is produced by a thermal cracking process as part of the hydrocarbon processing industry. Oily residue steams are heated up in a furnace coil and routed into a coke drum. The furnace effluent composition bonding breaks into light hydrocarbons and ultimately in solidified petroleum coke. The light hydrocarbons will be sent into refinery downstream units for further processing. The produced petroleum coke fills the coke drum from bottom to top continuously. As soon as one coke drum has been filled up, the oily residue will be switched to another empty coke drum.

According to a first embodiment, the upper end portion of the lower funnel comprises a load bearing flange at its upper end, and the lower end portion of the upper funnel comprises a upper load distributing flange arranged outside of and firmly connected to the upper funnel, a lower support flange resting on the load bearing flange of the upper end portion of the lower funnel, and at least two spring elements arranged between the upper load distributing flange and the lower support flange.

The at least two spring elements particularly extend in axial direction. The spring elements absorb the axial expansion of the coke drum unit, particularly of its lower cone to a certain extent, and the spring elements prevent an axial movement of the upper funnel connected to the coke drum unit from damaging the lower funnel or even the coke crushing unit.

According to a further embodiment, at least one circumferential sealing element is provided between the lower support flange of the lower end portion of the upper funnel and the outer circumference of the upper funnel.

According to a further embodiment, at least one circumferential sealing element is provided between the lower support flange of the lower end portion of the upper funnel and the load bearing flange of the upper end portion of the lower funnel.

According to a further embodiment, a first circumferential sealing element is provided between the lower support flange of the lower end portion of the upper funnel and the outer circumference of the upper funnel, and a second circumferential sealing element is provided between the lower support flange of the lower end portion of the upper funnel and the load bearing flange of the upper end portion of the lower funnel.

The arrangement of a coke drum unit and of a coke crushing unit comprising the first and second circumferential sealing elements as described herein provides at its inside a smooth surface with no dead spots where coke fines and coke pieces accumulate.

The first circumferential sealing particularly allows for an axial movement of the lower end portion of the upper funnel, whereas the second circumferential sealing provides for a radial movement of the lower end portion of the upper funnel, while both circumferential sealing elements reliably prevent steam or water polluted with coke fines from discharging into the atmosphere.

According to a further embodiment, the circumferential sealing element between the lower support flange of the lower end portion of the upper funnel and the upper end portion of the lower funnel is formed as a guiding and sealing funnel segment surrounding the lower end portion of the upper funnel.

According to a further embodiment, the guiding and sealing funnel segment is firmly connected, particularly welded to, the lower support flange of the lower end portion of the upper funnel.

According to a further embodiment, the guiding and sealing funnel segment has a diameter slightly greater than the diameter of the lower end portion of the upper funnel, such that the inner surface area of the guiding and sealing funnel segment is in sliding contact with the outer surface area of the lower end portion of the upper funnel, forming a sealing and allowing for a movement of the upper funnel in axial direction.

Such circumferential sealing element forms a sealing between the guiding and sealing funnel segment and the lower end portion of the upper funnel, which are two concentric tubes or funnels, and ensures that one can slide inside the other. The opposing surfaces of the guiding and sealing funnel segment and the lower end portion of the upper funnel preferably have a small friction coefficient to ensure that only little friction occurs during movement of the lower end portion of the upper funnel with respect to the guiding and sealing funnel segment. By such embodiments, a thermal expansion of the coke drum unit, particularly of its lower cone, in axial direction are reliably prevented from exerting forces to the coke crushing unit.

According to a further embodiment, an additional sealing member, particularly a stuffing box, is provided at the upper end of the guiding and sealing funnel segment. Such stuffing box further improves the sealing efficiency.

According to a further embodiment, an outwardly extending collar is arranged at the lower end of the upper funnel, the collar forming and end stop for the guiding and sealing funnel segment.

According to a further embodiment, the circumferential sealing between the lower support flange of the lower end portion of the upper funnel and the load bearing flange of the upper end portion of the lower funnel is formed as a circumferential sealing ring, particularly having a rectangular cross-section.

According to a further embodiment, the circumferential sealing ring rests on the load bearing flange of the upper end portion of the lower funnel.

According to a further embodiment, the circumferential sealing ring allows for a radial movement of the lower end portion of the upper funnel together with the guiding and sealing funnel segment and together with the lower support flange, with respect to the upper end portion of the lower funnel and to the load bearing flange of the upper end portion of the lower funnel.

Such circumferential sealing element makes sure that radial movements of the coke drum unit and of the upper funnel connected thereto are mechanically decoupled from the lower funnel and the coke crushing unit, and that such radial movement is possible without any bad impact on the efficiency of the system or even without any risk of damage of the system.

According to a further embodiment, the surface coming into contact with the coke pieces and the water of at least one of the upper funnel, the lower funnel and the guiding and sealing funnel segment comprises austenitic steel; and/or is lined with a weld cladding of hard material, particularly martensitic steel.

According to a further embodiment, the coke drum unit comprises a bottom unheading valve at its lower outlet, and wherein the upper funnel is firmly connected to the bottom unheading valve of the coke drum unit.

By such bottom unheading valve, the outlet of the coke drum can selectively be opened or closed. This enables the best possible supply of coke chunks that have been cut out of the coke drum by the coke cutting unit. If a bottom unheading valve is provided at the lower outlet of the coke drum, the upper funnel is preferably firmly connected to such bottom unheading valve, and there is no need from separating the upper funnel from the bottom unheading valve.

According to a further embodiment, at least one of the upper funnel and the lower funnel comprises a plurality of funnel segments. Adjacent funnel segments can be connected to each other by respective connection flanges.

By the use of separate funnel segments which are connected to each other by respective connection flanges, an easy mounting of the entire arrangement using standard parts is attained. In case the gap between the lower cone or the bottom unheading valve on the one hand and the coke crushing unit on the other is large, than more such funnel segments are used, whereas, when such gap is small, less funnel segments are used.

According to a further embodiment, at least one of the spring elements comprises a compression spring, particularly provided with an inner guiding, a pneumatic or hydraulic cylinder, or a spring support element comprising a compression spring and a pneumatic or hydraulic cylinder. The terms spring elements are used more generically in this disclosure and can be configured as structures that can bias elements and are not merely limited to springs.

For normal applications where the pressure level inside the upper and lower funnels is approximately at atmosphere pressure level, compression springs are normally sufficient. By use of an inner guiding, a bending of the spring can reliably be avoided.

For applications with higher pressure levels within the upper and lower funnels, for example if a valve provided below the coke crushing unit is closed, spring support elements or pneumatic or hydraulic cylinder are particularly suitable. If a valve provided below the coke crushing unit is closed, the pressure level within the upper and lower funnels can reach 4 to 5 bar.

According to a further embodiment, a valve is provided under the coke crushing unit by which the closed slurry pipe leading to the closed slurry pit can be selectively opened or closed. In case such a valve is provided, it is preferable to use a pneumatic or hydraulic cylinder as a spring element, since such spring elements exert the necessary forces.

According to a further embodiment, an orifice of reduced cross-section is provided at an upper end of the upper funnel, and particularly adjacent to the lower cone or the bottom unheading valve of the coke drum unit. Such orifice of reduced cross-section prevents too large coke chunks from reaching the coke crushing unit. While being caught in the orifice, such large coke chunks can be crushed into smaller coke pieces by using the coke cutting unit.

According to a further embodiment at least one of the upper and lower funnel comprises a maintenance opening, through which an access to the inside of the upper and lower funnels for maintenance work is provided.

According to a further embodiment, the arrangement further comprises a coke cutting unit for cutting the solidified petroleum coke out of the coke drum unit.

The coke cutting unit can use high pressure cutting water in order to cut out coke chunks from the solidified petroleum coke. However, mechanical cutting mechanisms can also be used.

The coke cutting unit can be a water drilling/cutting tool configured to a cut vertical channel into the solidified petroleum coke within the coke drum unit and to cut slices of the solidified petroleum coke within the coke drum unit, which allows for effective and fast cutting of the solidified coke out of a coke drum unit. The water drilling/cutting tool can be operated to get water from the clean water tank, so no external water is needed. The water drilling/cutting tool can be configured to be lowered into the coke drum via the upper drum head to ream out the coke drum with a high pressure water jet. In particular, the water drilling/cutting tool can be configured to drill a vertical channel into the coke bed, followed by the cutting operation whereby a horizontal jet stream cuts slices of coke of the coke bed, which are flushed down to the coke crushing unit.

The invention also relates to a closed gas tight system for gaining sellable petroleum coke pieces out of solidified petroleum coke in a coke drum unit comprising an arrangement of a coke drum and of a coke crushing unit as described herein, and the following features: a closed slurry pipe leading petroleum coke slurry from the coke crushing unit(s) of the at least one arrangement to a closed slurry pit; a dewatering bin unit for receiving petroleum coke slurry from the slurry pit, for collecting the sellable petroleum coke pieces and for leading filtered water and petroleum coke fines out of it; a closed drain water pit, separate from the slurry pit, for receiving the filtered water and the petroleum coke fines from the dewatering bin unit; a water settling tank receiving the filtered water and the petroleum coke from the drain water pit and for separating the petroleum coke fines from the water such that the petroleum coke fines collect in the bottom part of the water settling tank, and for leading the petroleum coke fines into the slurry pit where they mix with the petroleum coke slurry; a clean water tank for receiving the purified water from the upper part of the water settling tank; and a removal unit for removing the sellable petroleum coke pieces from the dewatering bin unit.

The same embodiments and advantages as explained with respect to the arrangement of a coke drum unit and of a coke crushing unit also apply for the system for gaining sellable petroleum coke pieces out of solidified petroleum coke in a coke drum unit. They are not repeated for reasons of brevity.

The system for gaining sellable petroleum coke pieces out of solidified petroleum coke in a coke drum unit according to the invention reduce the discharge of steam polluted with coke fines to the atmosphere, since the system is closed and gastight, and no steam can get into the atmosphere in uncontrolled manner as has been the case with the conventional pad/pit-system. Besides the substantial reduction of the impact on the atmosphere, this also eliminates the operating and maintenance personnel exposure to steam, dust, and aerosols, which leads to a high system acceptance and reduces atmospheral issues with local authorities. Thereby a high standard in working place hygiene and workers safety is achieved, especially in terms of visibility and exposure to hot water, steam and dust.

BRIEF DESCRIPTION OF THE DRAWINGS

Exemplary embodiments of the present invention are described hereinafter with respect to the attached Figures.

DETAILED DESCRIPTION

Figure 1:
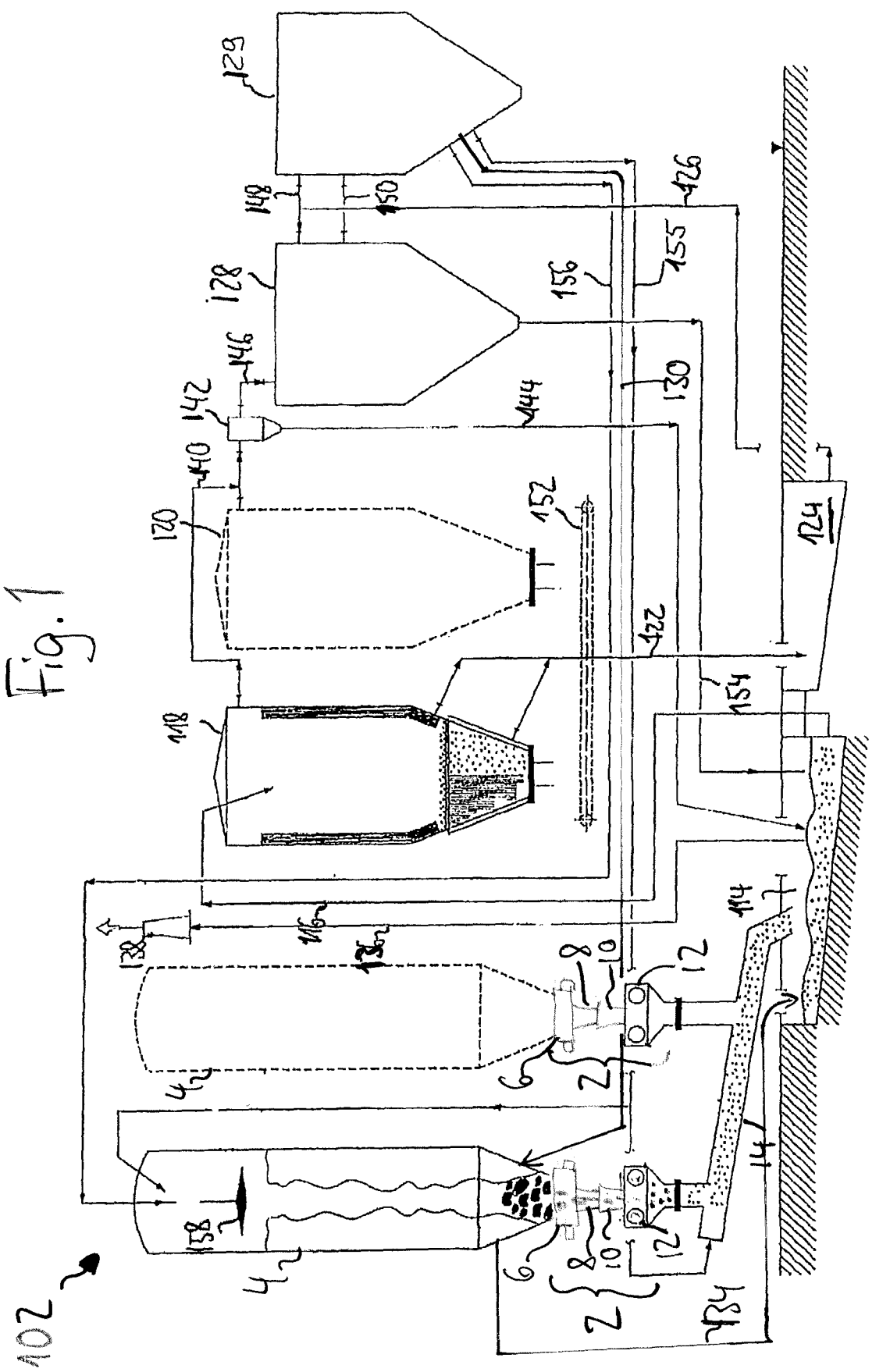
FIG. 1 shows a schematic connection diagram of a closed system for gaining sellable petroleum coke pieces out of solidified petroleum coke in a coke drum unit, including an arrangement of a coke drum unit and of a coke crushing unit, according to an embodiment of the invention.

FIG. 1 shows a schematic connection diagram of a closed system 102 for gaining sellable petroleum coke pieces out of solidified petroleum coke in a coke drum unit 4, including an arrangement 2 of a coke drum unit 4 and of a coke crushing unit 12.

For the sake of brevity, the system 102 for gaining sellable petroleum coke pieces out of solidified petroleum coke in a coke drum unit 4 that is depicted in FIG. 1 is called closed coke slurry system.

The system 102 comprises two identical arrangements of a coke drum unit 4 and a coke crushing unit 12 installed underneath and a corresponding number of dewatering bins, namely dewatering bins 118 and 120.

The two coke drums 4 forming the coke drum unit are shown in the left hand portion of FIG. 1, whereas the dewatering bins 18 and 20 are shown in the middle of FIG. 1. The left coke drum 4 has been filled with petroleum coke that has been solidified in there to form a coke bed and has been decoupled from the furnace core (not shown), and the left dewatering bin 18 receives the petroleum coke pieces from the coke drum 4, as will be explained below.

The second coke drum 4 and the second dewatering bin 120 are shown in dashed lines which means that they are not used during the drum decoking process of the coke drum 4 but in a later decoking process, when the second coke drum 4 has been filled up with a liquid residue to form a coke bed.

The coke drums 4 have lower conical segments/cones and bottom unheading valves 6 forming the lower most end of the coke drums 4. The bottom unheading valves 6 can be selectively opened or closed to enable a control of the supply of coke chunks to the coke crushers 12. Under the coke drums 4, there are arranged coke crushers 12 forming the coke crushing unit. They are connected to the respective coke drums 4 by an arrangement of upper and lower funnels 8 and 10 providing a gas-tight sealing to the atmosphere while decoupling the coke drums 4, particularly their lower cones, their bottom unheading valves 6 and their upper funnels 8 from the lower funnels 10 and from the coke crushers 12 as will be explained in more detail with respect to FIGS. 2, 3 and 4.

The upper funnels 8 are firmly connected to the bottom unheading valves 6, respectively, and the lower funnels 10 are firmly connected to the coke crushers 12, respectively. The upper and lower funnels 8 and 10 stay connected to the bottom unheading valve 6 on the one hand and to the coke crushers 12 on the other, and there is no pulling back of a telescoping chute with respect to the bottom of the coke drums as has been the case in the WO 2012/152340 A1.

The coke crushers 12 are mounted below the respective coke drums 4 and are connected to the same, particularly to their bottom unheading valve 6, such that coke chunks cut out of the coke bed will get through the upper and lower funnels 8 and 10 into the coke crushers 12 where they are grinded to sellable coke pieces of a maximum size of 4" (100 mm). Coke pieces of this size can be sold commercially, and they can also be pumped together with the coke-water mixture which will be referred to as slurry afterwards. In order for the coke chunks to get to the coke crushers 12 the bottom unheading valves 6 can be opened.

The outlet lines of the coke crushers 12 both connect to a slurry pipe 14 that is formed as a closed, oblique pipe, and is made from corrosion and abrasive resistant material. The sellable coke pieces get—by gravity—through the slurry pipe 14 to a slurry pit 114 which is formed as a tight concrete pump pit. From the slurry pit 114, particularly from a bottom portion thereof there extends a slurry line 116 to the upper portion of the dewatering bin 118, through which coke slurry from the slurry pit gets to the dewatering bin 118. The dewatering bin 118 comprises an upper cylindrical section and a lower conical section. The upper cylindrical section and the upper part of the lower conical section are provided at their inner circumferential portions with filter elements that are formed as screens/sieves, particularly as vertical inner bar screens/sieves in this embodiment, and the lower part of the lower conical section is provided with a filter element which is formed as a perforation pattern in this embodiment. These filter elements are designed to keep the sellable coke pieces in the dewatering bin 118 and to let water comprising coke particles/coke fines pass through. The filter elements of the dewatering bins are connected by means of a drain water line 122 to a drain water pit 24 which is formed separately from the slurry pit 114. In the figures, only the drain water line 122 leading from the filter elements of the first dewatering bin 118 to the drain water pit 124 is shown, a similar drain water line is provided for the second dewatering bin 120. Both the slurry pit 114 and the drain water pit 124 can be concrete pits and can have a flow optimized design with no stagnant/dead areas.

The bottom portions of the dewatering bins 118 and 120 that are depicted by horizontally extending black lines are opened in order to take the sellable coke pieces out of the dewatering bin at the very end of the delayed coking process. At the very end of the delayed coking process, when the sellable coke pieces are taken out of the dewatering bin they fall through the opened bottom part of the dewatering bin on an appropriate conveyor means which is in the present exemplary embodiment configured as conveyer belt 152 by which the sellable coke pieces are transported to the loading facilities (not shown).

From the drain water pit 124, particularly from its bottom portion, there extends a drain water line 126 which connects to an upper portion of a water settling tank 128. This drain water line 126 can also be connected to a clear water tank 129 by means of a line portion 148 branching off from the drain water line 126.

Additionally, there is arranged a horizontal balancing line 150 between an upper portion of the water settling tank 128 and an upper portion of the clean water tank 129 in order to balance the water levels between those two tanks. Both the slurry line 116 and the drain water line 126 are provided with appropriate pumps (not shown) such that the petroleum coke slurry comprising sellable coke pieces are pumped from the slurry pit 114 to the dewatering bin 118 and the drain water from the drain water pit 124 are pumped to the water settling tank 128. The slurry line 116 is of such diameter that the coke slurry comprising sellable coke pieces gets through. Likewise the pump provided in the slurry line is of such configuration that the coke slurry comprising the sellable coke pieces can be pumped. The pump in the slurry line 116 has an impeller design and a casing construction and a material that results in high wear resistance and high tolerance level against cavitation damage.

In the present exemplary embodiment, one line portion of the drain water line 120 connects to the lower end of the vertical screen filtering element and another line portion attaches to the lower end of the perforation filter element, and both line portions connect to a common drain water line 122. By such filter elements the coke slurry comprising the sellable coke pieces within the dewatering bin 118 can be dewatered effectively. No other fixed or floating devices have to be provided. Generally, no backflush nozzles are needed.

Both the water settling tank 128 and the clean water tank 129 are depicted schematically with a cylindrical upper section and a conical lower section. The lines connecting to the conical lower section in order to remove coke fines from the water settling tank 128 and to remove water from the clean water tank 129 are not shown in FIG. 1.

The dewatering bins 118 and 120 are provided with an overflow protection unit/overflow screen that has no active function in normal operation but serves as a safety valve to protect the dewatering bins 118 and 120 from overfilling inadvertently. The overflow screen in the present embodiment is formed as a overflow line 140 attaching at the uppermost portion of the dewatering bins 118 and 120 and a safety valve 142 through which the coke slurry from the dewatering bin is led firstly by means of overflow line 144 to the slurry pit 114 and secondly, if necessary in addition, via overflow line 146 to the water settling tank 128.

For the quenching operation/quenching cycle that is carried out during the delayed decoking process, a cold quench water line 130, a cooling water line 132 and a hot quench water line 134 are provided. The cold quench water line 130 attaches to a lower portion or a bottom portion of the clean water tank 129 and leads to the respective dewatering bin. In FIG. 1 the cold quench water line 130 is shown to lead to the first coke drum 4, a similar cold quench water line 130 can also extend from the clean water tank 129 to the second coke drum 4. By means of the cold quench water line 130 the hot coke bed within the coke drum 4 is cooled down. From the first coke drum 4, and likewise from the second coke drum 4 (which is not shown) the hot quench water line 134 extends to the slurry pit 114, this hot quench water line 134 leading the quench water that has been warmed up in heat exchange against the coke bed gets into the slurry pit 114. In order to avoid or limit the steam generation within the slurry pit 114, a slurry pit cooling water line 132 branches off from the cold quench water line 130, and cold water coming from the clean water tank 129 is led directly to the slurry pit 114. The cooled mixed quenchwater from the slurry pit 114 is pumped via line 116 in the dewatering bin 118. From the dewatering bin 118—acting as filter—the drainwater runoff flows with line 122 to the clean water pit 124 and is pumped from there via line 126 to the water settling tank 128.

There is a vapor/steam discharging line 136 attaching to the closed slurry pit 114 for routing of remaining vapor to the atmosphere through a vent 138. This vent 138 is preferably positioned above a working platform above operator level in order to minimize the exposure of operating and maintenance personnel to vapor.

Likewise, steam/vapor discharging lines and vents are provided at the dewatering bins 118 and 120 (not shown) and at the drain water pit 124 (not shown).

There is a line 54 leading from the bottom of the water settling tank 28 to the slurry pit 14, a transport water line 55 leading from the bottom of the clean water tank 29 to the upper portion of the coke drum 4 (a similar line can also lead to the upper portion of the coke drum 8) and to the end portion of the slurry pipe 12 being located upstream of the flow of sellable coke pieces through the slurry pipe 12. Furthermore there is provided an additional transport water line 56 extending from a lower portion of the water settling tank 28 to the top portion of the coke drum 4. Moreover, there is a schematically depicted a coke cutting unit 58 which is configured to be lowered via the upper coke drum head into the coke drum 4 to ream out the coke drum with high pressure water jets. This coke cutting unit 58 can be a specialized tool configured to drill a vertical channel into the coke bed first, followed by a cutting operation whereby a horizontal jet stream cut slices of coke out of the coke bed which are then flushed down through the opened bottom unheading valve 6 and through the upper and lower funnels 8 and 10 to the coke crusher 12.

The coke bed within the coke drum 4 is schematically depicted during ream out operation with a vertical channel and with some coke chunks at the bottom. Likewise, the coke pieces flowing through the slurry pipe 14 have been grinded by the coke crusher 12 to a sellable size, the coke slurry within the slurry pit 114 comprising a mixture of sellable coke pieces, smaller coke particles and water. The sellable coke pieces collecting in the dewatering bin 18 from bottom to top are also depicted schematically.

In the coke cutting and dewatering cycle operation, the bottom unheading valve 6 of the first coke drum is opened, whereas the bottom unheading valve 6 of the second coke drum 4 is closed, until the second coke drum 4 will operated in the coke cutting and dewatering cycle.

In the dewatering cycle operation, the bottom unheading valves 6 of both coke drums 4 are closed, and one or both of the coke drums 4 can be filled with petroleum coke again.

Figure 2:
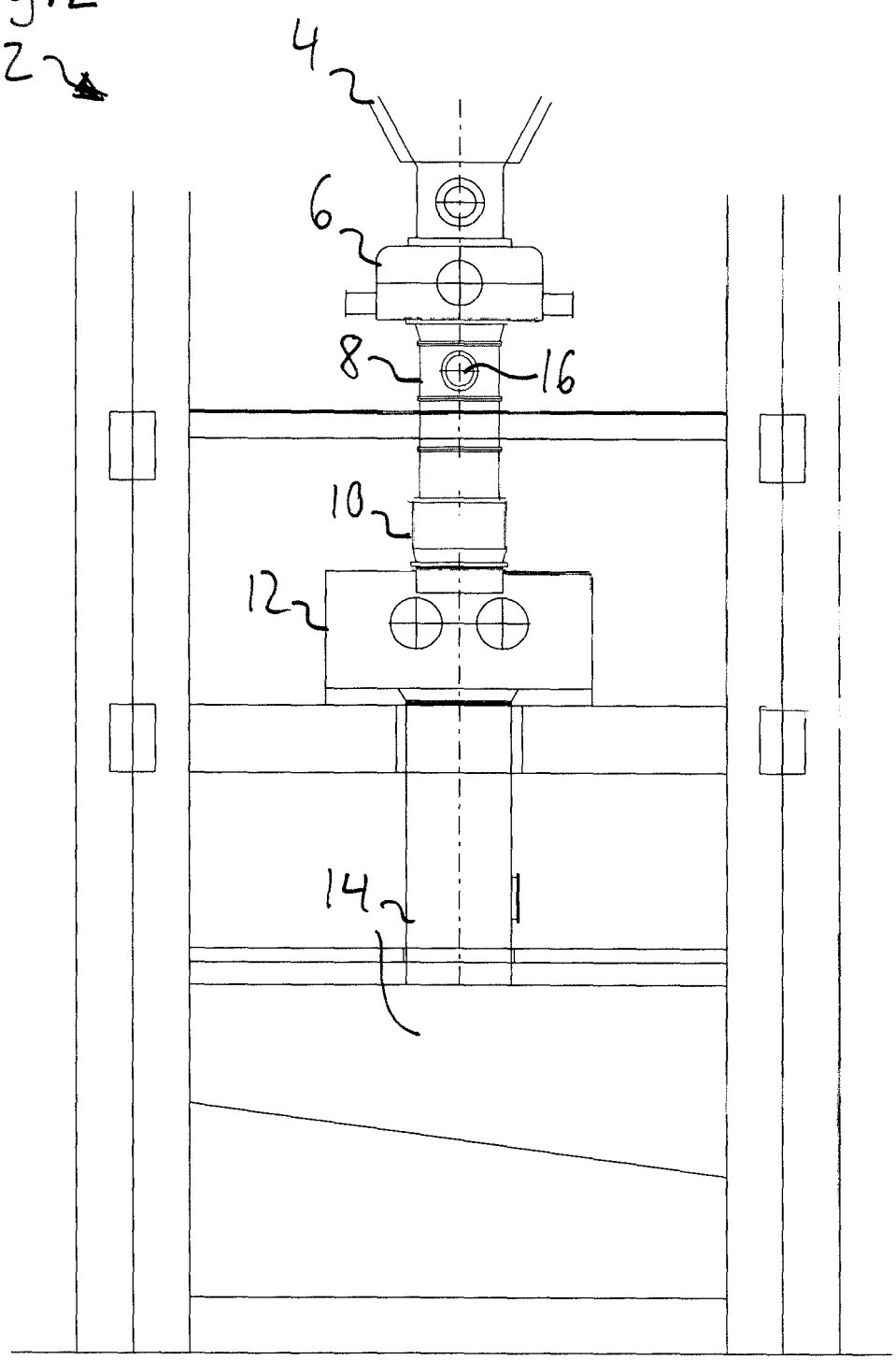
FIG. 2 shows an enlarged cutout view of the arrangement of a coke drum unit and a coke crushing unit of FIG. 1.

FIG. 2 shows an enlarged cutout view of the arrangement 2 of a coke drum unit 4 and a coke crushing unit 12 of FIG. 1.

FIG. 2 shows, from top to bottom, a cone forming the lower end of the coke drum unit 4, the bottom unheading valve 6 which can open and close the lower outlet of the coke drum 4 selectively, the upper funnel 8 firmly connected to the lower end of the bottom unheading valve 6 and extending axially in a downward direction, the funnel 10 firmly connected to the coke crusher 12 arranged beneath of it, and the lower coke crusher 12. These elements together form the arrangement 2 of a coke drum unit 4 and a coke crushing unit 12.

The slurry pipe 14 which attaches to the coke crusher 12 comprises an axial funnel portion connected to the lower outlet of the coke crusher 12 and a closed oblique pipe through which the sellable coke pieces together with the coke fines-water mixture are guided by gravity to the slurry pit 114, as can further be seen in FIG. 1.

The upper funnel 8 is composed of a number of substantially cylindrical funnel segments, and adjacent funnel segments are connected to each other in a gas-tight fashion.

Further a maintenance opening/manhole 16 is provided in one of the upper funnel segments. The upper funnel 8 has a smaller diameter than the lower funnel 10, and the lower end portion of the upper funnel 8 extends into the upper end portion of the lower funnel 10, as will be explained in more detail with respect to FIGS. 3 and 4.

Not shown in FIG. 2 are the upper load distributing flange, the lower support flange and the two spring elements of the lower end portion of the upper funnel 8 and load bearing flange at the upper end of the upper end portion of the lower funnel 10.

Figure 3:
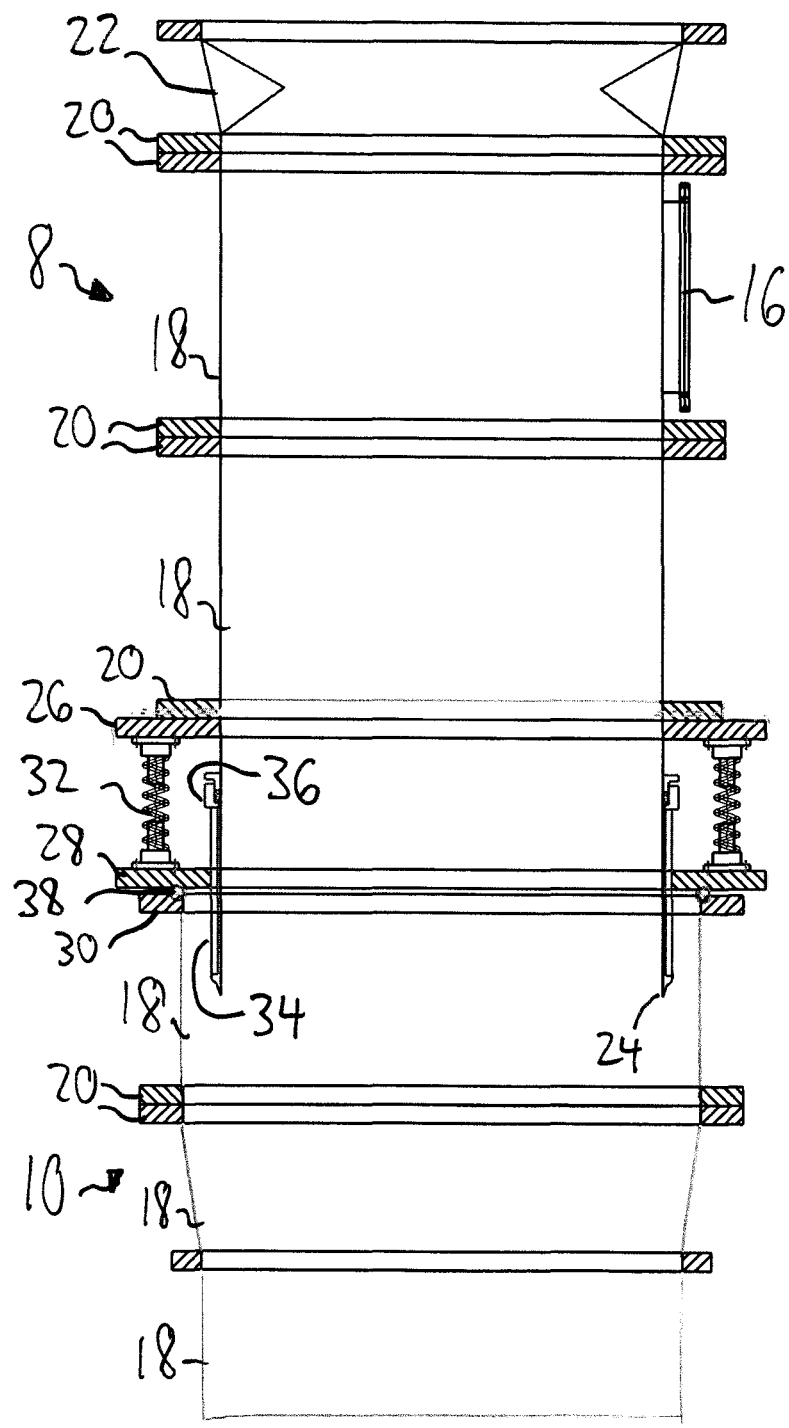
FIG. 3 shows an enlarged view of the upper and lower funnels of the arrangement of FIG. 2, according to an embodiment of the invention.

FIG. 3 shows an enlarged view of the upper and lower funnels 8 and 10 of the arrangement 2 of FIG. 2.

The upper funnel 8 comprises a number of funnel segments 18, and adjacent funnel segments 18 are connected to each other in a gas-tight fashion by connection flanges 20. The uppermost funnel segment forms an orifice 22, where coke chunks of too large size get stuck and can be crushed into smaller sizes by the coke cutting unit 158 (see FIG. 1).

The maintenance opening 18 is attached to the funnel segment 18 below the orifice segment 22.

Likewise, the lower funnel 10 comprises a number of funnel segments 18, and adjacent funnel segments 18 are connected to each other in a gas-tight fashion by connection flanges 20. The uppermost flange provided at the upper end of the lower funnel 10 forms a load bearing flange 30 on which a circumferential sealing ring 38 is firmly attached.

The second but upper funnel segment 18 has a widening diameter, see from bottom to top. The uppermost funnel segment 18 of the lower funnel 10 has a greater diameter than the diameter of the lower end portion of the upper funnel 8. The lower end portion of the upper funnel 8 extends into the upper end portion of the lower funnel 10 and particularly into the inside of the uppermost funnel segment 18 of the lower funnel 10.

The upper and lower funnels 18 and 10 are concentric to each other, when looked at in a cross-section, taken along a horizontal plane.

The lower end portion of the upper funnel 8 comprises a broadened collar-like load distributing flange 26 arranged outside of and firmly connected to the upper funnel 8, a lower broadened collar-like support flange 28 resting on a collar-like load bearing flange 30 of the upper end portion of the lower funnel 10, particularly on the circumferential sealing ring 38 provided on the load bearing flange 30 at its innermost end of its upper surface.

Two biasing members or simply known as spring elements 32 are arranged between the upper load distributing flange 26 and the lower support flange 28 and extend in an axial direction. The spring elements 32 are firmly connected with its ends, for example by bolts to the upper load distributing flange 26 and the lower support flange 28. The spring elements 32 in FIG. 3 are formed as compression springs, and they can be provided with inner guiding cylinders.

Attached to, particularly welded to the radially inward end of the broadened lower support flange 28 is a guiding and sealing funnel segment 34 which surrounds the lower end portion of the upper funnel 8. The guiding and sealing funnel segment 34 has a diameter slightly greater than the diameter of the lower end portion of the upper funnel 8, such that the inner surface area of the guiding and sealing funnel segment 34 is in sliding contact with the outer surface area of the lower end portion of the upper funnel 8, thereby forming a sealing and allowing for a movement of the upper funnel 8 in axial direction with respect to the lower funnel 10.

An additional sealing member 36 which can be a stuffing box can be provided at the upper end of the guiding and sealing funnel segment 34.

The lower end of the upper funnel 8 can be provided with an outwardly extending collar 24, which in the non-limiting embodiment of FIG. 3 extends outwardly and upwardly in an oblique fashion.

The circumferential sealing ring 38 forms a second circumferential sealing element. It allows for a radial movement of the lower end portion of the upper funnel 8 together with the guiding and sealing funnel segment 34 and together with the lower support flange 28, with respect to the upper end portion of the lower funnel 8 and to the load bearing flange 30 of the upper end portion of the lower funnel 10.

The surfaces coming into contact with the coke chunks and the water-coke fines mixture of the upper funnel 8 and the lower funnel 10, which are the radially inner surface area of the upper and lower funnels 8 and 10, the radially outer surface area of the lowermost end of the upper funnel 8 and the radially outer surface area of the guiding and sealing funnel segment 30 can be lined with a weld cladding of a hard material, particularly a martensitic steel.

The upper and lower funnels 8 and 10 and the guiding and sealing funnel segment 34 can be made out of a hard material, particularly of austenitic steel.

It is preferable that all the surfaces are smooth in order to prevent dead spots where coke fines or coke pieces can accumulate.

The uppermost funnel segment particularly the funnel segment comprising the orifice 22 is firmly and tightly connected to the bottom unheading valve 6 of the coke drum 4, and the lowermost funnel segment 18 of the lower funnel 10 is connected firmly and tightly to the inlet of the coke crusher 12.

The inner surface area of the guiding and sealing funnel segment 34 with the stuffing box 36 arranged at its upper end together with the outer surface area of the lower end portion of the upper funnel 8 forms a first circumferential sealing element with respect to movement of the upper funnel 8 in axial direction.

The circumferential sealing ring 38 provided between the load bearing flange 30 of the lower funnel 10 and the lower support flange 28 of the upper funnel 8 provides, together with the upper load distributing flange 26, the lower support flange 28 and the guiding and sealing funnel segment 34 a second circumferential sealing element with respect to movement of the upper funnel 8 with respect to movement in radial direction.

If the coke drum 4 expands or shrinks as a consequence of heating up to 700° C. during decoking operation and cooling down to about 100° C. during quenching operation the upper funnel 8 moves downwardly and upwardly in axial direction, while the load bearing flange 30 of the lower funnel 10 and the lower support flange 28 of the upper funnel 8 and together with it the guiding and sealing funnel segment 34 maintain in the same axial position, the spring elements 32 exert a counterforce against a downward movement of the upper funnel 8 and prevent a too large downward movement of the upper funnel 8.

In this way, the upper funnel 8 is decoupled mechanically from the lower funnel 10 while keeping the system gas-tight and avoiding a too high pressure onto the lower funnel 10 and the coke crusher 12.

If the coke drum unit 4 together with its bottom unheading valve 6 and the upper funnel 8 move in radial direction, also in consequence of thermal expansion or shrinking or in response to mechanical shocks, then the upper funnel 8 together with the spring element 32, the lower support flange 28 and the guiding and sealing funnel segment 34 can move in radial direction with respect to the load bearing flange 30 and the circumferential sealing ring 38.

Thus, also a mechanical decoupling of the upper funnel 8 from the lower funnel 10 is achieved while keeping the system gas-tight.

The amount of axial movement in downward direction is limited by the upper load distributing flange 26 not touching the upper end of the guiding and sealing funnel segment 34, particularly the stuffing box 36 at its upper end.

Figure 4:
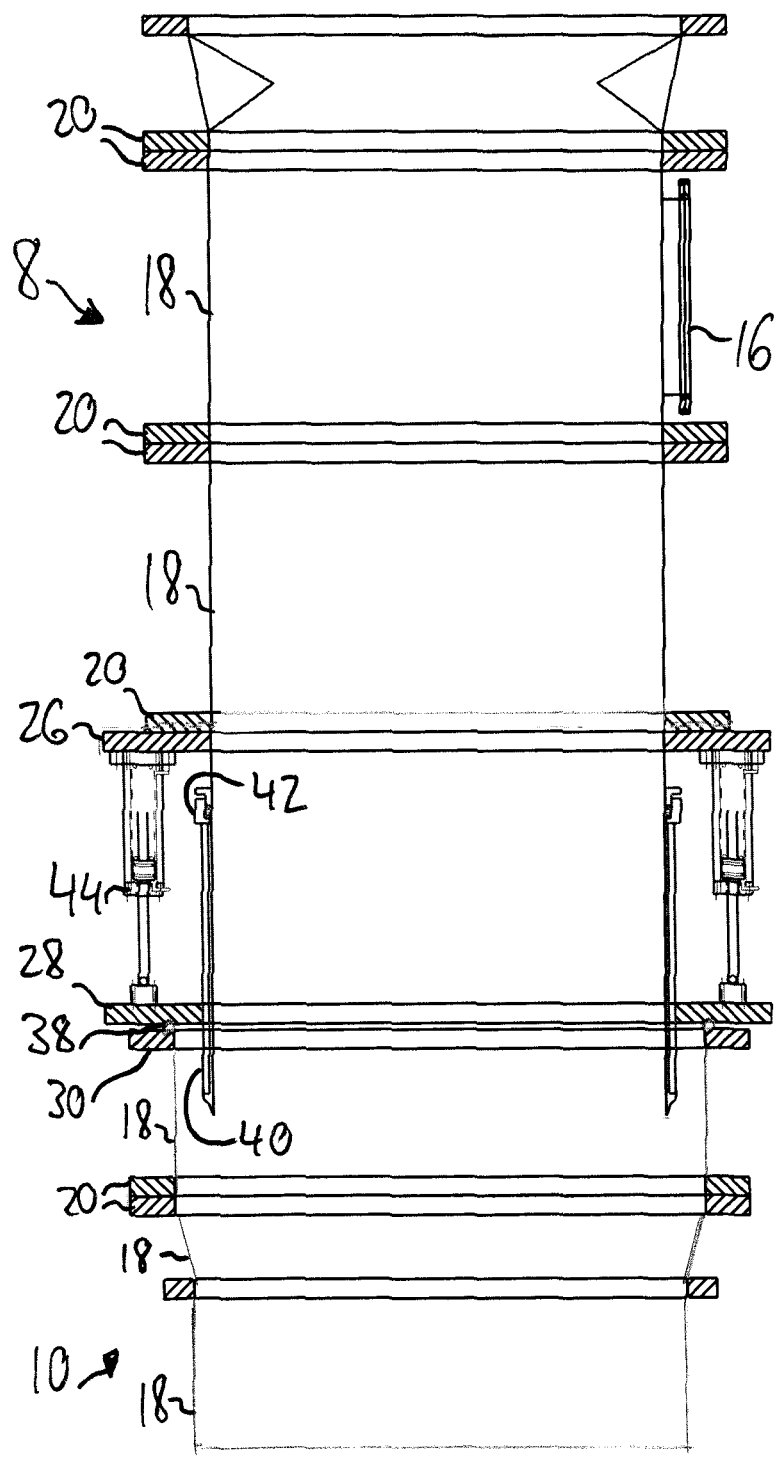
FIG. 4 shows an enlarged view of the upper and lower funnels of the arrangement of FIG. 2, according to an alternative embodiment of the invention.

FIG. 4 shows an enlarged view of the upper and lower funnels 8 and 10 of the arrangement 2, according to an alternative embodiment.

In FIG. 4, like elements are designated by like reference numerals, and in order to avoid repetition, it is referred to the description of FIG. 3.

In FIG. 4, the spring elements are formed as hydraulic cylinders 44, and the guiding and sealing funnel segment 40 has a higher axial height.

The amount of axial movement in downward direction is limited by the upper load distributing flange 26 not touching the upper end of the guiding and sealing funnel segment 40, particularly the stuffing box 42 at its upper end.

Hydraulic cylinders 44 as spring elements are provided in FIG. 4, and they are particularly suitable for higher pressure levels within the upper and lower funnels 8 and 10, particularly pressure levels between 4 and 5 bar. Such higher pressure levels than the pressure level of the atmosphere regularly occur, if a valve provided below the coke crusher 12 (not shown in FIG. 1) is closed.

By the arrangement of a coke drum unit and of a coke crushing unit, for use in a closed, gastight system for gaining sellable petroleum coke pieces out of solidified petroleum coke in a coke drum unit, and by such closed, gastight system, as described herein, the safety of operation, particularly at the side of the coke drum unit and the coke crushing unit, is substantially improved, and damages, like cracks or leaks, in the connection between the coke drum unit and the coke crushing unit are reliably avoided, despite of unavoidable movement of the coke drum.

The invention claimed is:

1. A system comprising a coke drum unit and of a coke crushing unit, for use in a closed, gastight system for gaining sellable petroleum coke pieces out of solidified petroleum coke in the coke drum unit, comprising:
   the coke drum unit containing solidified petroleum coke;
   the coke crushing unit for crushing the petroleum coke into sellable petroleum coke pieces arranged below the coke drum unit; wherein
   a lower funnel is connected to the coke crushing unit and has an upper end portion;
   an upper funnel is connected to the lower end of the coke drum unit and has a lower end portion with a smaller diameter than the upper end portion of the lower funnel;
   the lower end portion of the upper funnel extends into the upper end portion of the lower funnel; and
   at least one circumferential sealing element provides a gastight seal between the upper funnel and the lower funnel and allowing for an axial and a radial movement of the upper funnel with respect to the lower funnel;
   wherein the upper end portion of the lower funnel comprises a load bearing flange at an upper end;
   wherein the lower end portion of the upper funnel comprises
      an upper load distributing flange arranged outside of and firmly connected to the upper funnel, and
      a lower support flange resting on the load bearing flange of the upper end portion of the lower funnel,
   wherein at least two spring elements are configured to exert a force on the upper load-distributing flange and the lower support flange, the spring elements are arranged between the upper load distributing flange and the lower support flange; and
   wherein the at least one circumferential sealing element comprises at least one of
   a first circumferential sealing element between the lower support flange of the lower end portion of the upper funnel and the outer circumference of the upper funnel; and
   a second circumferential sealing element comprising a circumferential sealing ring between the lower support flange of the lower end portion of the upper funnel and the load bearing flange of the upper end portion of the lower funnel.

2. The system of claim 1,
   wherein the first circumferential sealing element between the lower support flange of the lower end portion of the upper funnel and the outer circumference of the upper funnel is formed as a guiding and sealing funnel segment surrounding the lower end portion of the upper funnel;
   wherein the guiding and sealing funnel segment is firmly connected, particularly welded to, the lower support flange of the lower end portion of the upper funnel;
   wherein the guiding and sealing funnel segment has a diameter slightly greater than the diameter of the lower end portion of the upper funnel, such that the inner surface area of the guiding and sealing funnel segment is in sliding contact with the outer surface area of the lower end portion of the upper funnel, forming a seal and allowing for movement of the upper funnel in an axial direction.

3. The system of claim 1,
   wherein a stuffing box, is provided at the upper end of a guiding and sealing funnel segment;
   wherein an outwardly extending collar is arranged at the lower end of the upper funnel, the collar forming and end stop for the guiding and sealing funnel segment.

4. The system of claim 1,
   wherein the second circumferential sealing element between the lower support flange of the lower end portion of the upper funnel and the load bearing flange of the upper end portion of the lower funnel is formed as the circumferential sealing ring having a rectangular cross-section;
   wherein the circumferential sealing ring rests on the load bearing flange of the upper end portion of the lower funnel;
   wherein the circumferential sealing ring allows for a radial movement of the lower end portion of the upper funnel together with a guiding and sealing funnel segment and together with the lower support flange, with respect to the upper end portion of the lower funnel and to the load bearing flange of the upper end portion of the lower funnel.

5. The system of claim 1, wherein a surface coming into contact with the coke pieces and water of at least one of the upper funnel, the lower funnel and the guiding and sealing funnel segment comprises at least one of,
   an austenitic steel; and
   is lined with a weld cladding of hard material.

6. The system of claim 1, wherein the coke drum unit comprises a bottom unheading valve at a lower outlet, and wherein the upper funnel is firmly connected to the bottom unheading valve of the coke drum unit.

7. The system of claim 1, wherein at least one of the upper funnel and the lower funnel comprises a plurality of funnel segments, wherein adjacent funnel segments are connected to each other by respective connection flanges.

8. The system of claim 1, wherein at least one of the spring elements comprises a compression spring, a pneumatic or hydraulic cylinder, or a spring support element comprising a compression spring and a pneumatic or hydraulic cylinder.

9. The system of claim 1, wherein a valve is provided under the coke crushing unit, and wherein at least one of the spring elements comprises a pneumatic or hydraulic cylinder.

10. The system of claim 1, further comprising an orifice provided at an upper end of the upper funnel.

11. The system of claim 1, wherein at least one of the upper funnel and the lower funnel comprises a maintenance opening.

12. The system of claim 1, further comprising:
a coke cutting unit for cutting the solidified petroleum coke out of the coke drum unit.

13. A closed, gastight system for gaining sellable petroleum coke pieces out of solidified petroleum coke in a coke drum unit, comprising:
a coke drum unit and a coke crushing unit, according to claim 1; and
a closed slurry pipe leading petroleum coke slurry from the coke crushing unit(s) of the at least one arrangement to a closed slurry pit;
a dewatering bin unit configured for receiving petroleum coke slurry from the slurry pit, said dewatering bin unit configured for collecting the sellable petroleum coke pieces and said dewatering bin unit configured for leading filtered water and petroleum coke fines out of said dewatering bin unit;
a closed drain water pit, separate from the slurry pit, for receiving the filtered water and the petroleum coke fines from the dewatering bin unit;
a water settling tank receiving the filtered water and the petroleum coke from the drain water pit and for separating the petroleum coke fines from the water such that the petroleum coke fines collect in the bottom part of the water settling tank, and for leading the petroleum coke fines into the slurry pit where they mix with the petroleum coke slurry;
a clean water tank for receiving the purified water from the upper part of the water settling tank.

* * * * *